Patented Mar. 29, 1927.

1,622,390

UNITED STATES PATENT OFFICE.

WALTER E. MILLER, OF VINELAND, NEW JERSEY, ASSIGNOR TO SILMO CHEMICAL COMPANY, INC., OF VINELAND, NEW JERSEY.

PROCESS OF PRODUCING FISH-OIL POWDER.

No Drawing. Application filed March 5, 1926. Serial No. 92,639.

This invention relates to a process of producing fish oil powder, namely, reducing fish oil to the form of a powdered solid, the object of the invention being to provide a simple, economical and efficient process for the purpose.

In carrying the process into practice, I place a given quantity of fermented milk in an air-tight wooden vat or vessel equipped with an agitator, and then add the fish oil slowly or from time to time to the milk, agitating the mixture after each addition, until the weight of the oil equals the weight of the total solids in the fermented milk. The mixture is then allowed to remain quiescent in the vat or vessel for a period of about 48 hours at a temperature of about 50° F., whereby the oil is well incorporated in the milk. Water is then added to the mixture to an amount equal to the amount of oil previously added and the mixture again agitated to secure a thorough blending of the milk, oil and water, after which the mixture is drained from the vat and passed through a homogenizer at 3500 pounds pressure. The emulsion thus produced is then conducted to an air-tight wooden vat or tank and allowed to stand for a period of about 48 hours at a temperature of about 50° F. From this vat the emulsion is run into a tank provided with air-pressure spraying mechanism and the emulsion sprayed upon the surface of a revolving vacuum drum at a temperature of about 70° F., where it rapidly dries. The solid matter is finally scraped off and is powdered in suitable manner and is then immediately ready for use, for instance as conditioning admixture to animal feed.

I claim:—

The process of reducing fish oil to powdered form, which consists in placing a given amount of fermented milk in an air-tight receptacle, adding thereto the oil slowly while agitating the mixture until the weight of the oil substantially equals the weight of the total solids in the fermented milk, allowing the mixture to stand in the vessel at a temperature of about 50° F. for a period of about 48 hours, adding water to the mixture and agitating the same until the amount of the water substantially equals the amount of the oil, homogenizing the mixture to produce an emulsion, allowing the emulsion to stand at a temperature of about 50° F. for a period of about 48 hours, separating the solid matter from the liquids at a temperature of about 70° F., and collecting and powdering the solid matter.

In testimony whereof I affix my signature.

WALTER E. MILLER.